United States Patent
Kubler et al.

(10) Patent No.: US 7,525,238 B2
(45) Date of Patent: Apr. 28, 2009

(54) GROUND INSULATED PIEZOELECTRIC SENSOR FOR THE MEASUREMENT OF ACCELERATION OR PRESSURE

(75) Inventors: John M. Kubler, Erlanger, KY (US); Andrew Paul Cook, Amherst, NY (US)

(73) Assignee: Kistler Holding AG, Winterthur (CH)

( * ) Notice: Subject to any disclaimer, the term of this patent is extended or adjusted under 35 U.S.C. 154(b) by 128 days.

(21) Appl. No.: 11/814,533

(22) PCT Filed: Jan. 25, 2006

(86) PCT No.: PCT/CH2006/000052

§ 371 (c)(1),
(2), (4) Date: Jul. 23, 2007

(87) PCT Pub. No.: WO2006/079239

PCT Pub. Date: Aug. 3, 2006

(65) Prior Publication Data
US 2008/0203854 A1    Aug. 28, 2008

(51) Int. Cl.
*H01L 41/08* (2006.01)
(52) U.S. Cl. ...................................... 310/338; 310/329
(58) Field of Classification Search ................. 310/329, 310/338
See application file for complete search history.

(56) References Cited

U.S. PATENT DOCUMENTS

| | | | |
|---|---|---|---|
| 3,743,869 A | | 7/1973 | Hugli |
| 4,075,525 A | * | 2/1978 | Birchall ....................... 310/329 |
| 4,941,243 A | * | 7/1990 | Cleveland ................... 29/25.35 |
| 6,637,677 B1 | * | 10/2003 | Ruehle et al. ............... 239/584 |
| 6,868,714 B2 | * | 3/2005 | Mueller et al. ............. 73/35.11 |

FOREIGN PATENT DOCUMENTS

EP    0430445 A2    5/1991

OTHER PUBLICATIONS

PCT International Search Report, PCT/CH2006/000052, Mar. 8, 2006.

* cited by examiner

*Primary Examiner*—Mark Budd
(74) *Attorney, Agent, or Firm*—Dority & Manning, P.A.

(57) ABSTRACT

The invention describes a sensor comprising an element package 2 including piezoelectric elements with an upper area 6 and a lower area 7. A preload sleeve 3 surrounds the said upper area 6 of the said element package 2, while an insulation sleeve 1 sits between the upper area 6 of the said element package 2 and the said preload sleeve 3. An outer housing 4 partially or fully surrounds the said preload sleeve 3 and the lower area 7 of the said element package 2. An insulation part 5 sits between the said lower area 7 of the element package 2 and the said outer housing 4, whereas the said upper area 6 of the said element package 2, the said insulation sleeve 1 and the said preload sleeve 3 have conical shapes and have conforming surfaces. Due to the conical size of the insulation sleeve 1, the load during a shock measurement is distributed on a larger surface area resulting in a reduced compression of the said insulation sleeve. Thereby, the maximum range of the sensor is increased.

20 Claims, 2 Drawing Sheets

GROUND INSULATED PIEZOELECTRIC SENSOR FOR THE MEASUREMENT OF ACCELERATION OR PRESSURE

FIELD OF THE INVENTION

The invention relates to a ground insulated piezoelectric sensor for the measurement of acceleration or pressure.

BACKGROUND OF THE INVENTION

Piezoelectric ground insulated sensors are well known. They are used in a variety of applications to measure acceleration, pressure, shock and related phenomena. A problem is encountered when piezoelectric sensors are used in conjunction with other electrical equipment. If the sensor is not carefully insulated from a grounded measurement surface, the sensor is subject to what is commonly referred to as electrical ground loops which have an adverse effect on the output. In order to provide ground loop insulation, it has been the custom to insert an insulator between the transducer base and the support, such as a shaker table or the like upon which the accelerometer is mounted. Unfortunately, most insulating materials, such as paper, plastics, and the like, have relatively poor physical properties and lack the strength and hardness required for properly mounting an accelerometer or other piezoelectric transducer.

In the U.S. Pat. No. 3,746,869, this problem is overcome because the sensor is mounted to its support by a rigid metallic insulator and more particularly by a metallic insulator having one or more surfaces coated with a very hard insulating surface.

In the described embodiment, the insulator takes the form of an aluminum sleeve or washer which has its surface contacting the sensor support provided with an aluminum oxide coating.

In many applications, the insulating components are rings or other parts with a relatively small surface. However, these components are highly stressed under full load. The maximum load or range the sensor can measure is limited by the surface area of the insulating material.

SUMMARY OF THE INVENTION

It is one objective of the present invention to provide a ground insulated piezoelectric sensor for the measurement of an acceleration or pressure input, incorporating insulating components with an increased maximum mechanical shock range of the sensor.

This objective is achieved by such a sensor comprising an element package including piezoelectric elements with an upper area and a lower area. A preload sleeve surrounds the said upper area of the said element package, while an insulation sleeve sits between the upper area of the said element package and the said preload sleeve. An outer housing partially or fully surrounds the said preload sleeve and the lower area of the said element package. An insulation part sits between the said lower area of the element package and the said outer housing, whereas the said upper area of the said element package, the said insulation sleeve and the said preload sleeve have conical shapes with conforming surfaces.

The insulating components in this preferred embodiment are the insulation sleeve and the insulation part. Due to the conical size of the insulation sleeve, its surface area is much larger than an equivalent ring shaped flat insulation, placed at right angles to the impact axis. Since the load due to impact during a measurement is distributed on a larger surface area, the specific load on the insulation sleeve is reduced and thereby the maximum range of the sensor is increased.

The lower insulation component, the insulation part, can cover the whole surface area of the element package. Alternatively, the insulation part can be a second conical insulation sleeve fitted in shape and size between the lower area of the element package and the outer housing, which, in this case, are also both conical and reverse orientated to the cones of the upper area.

BRIEF DESCRIPTION OF THE DRAWINGS

These and further objectives and advantages of the invention will be more apparent upon reference to the following specification, claims, and appended drawings, wherein:

DETAILED DESCRIPTION OF THE PREFERRED EMBODIMENT

Figure 1:
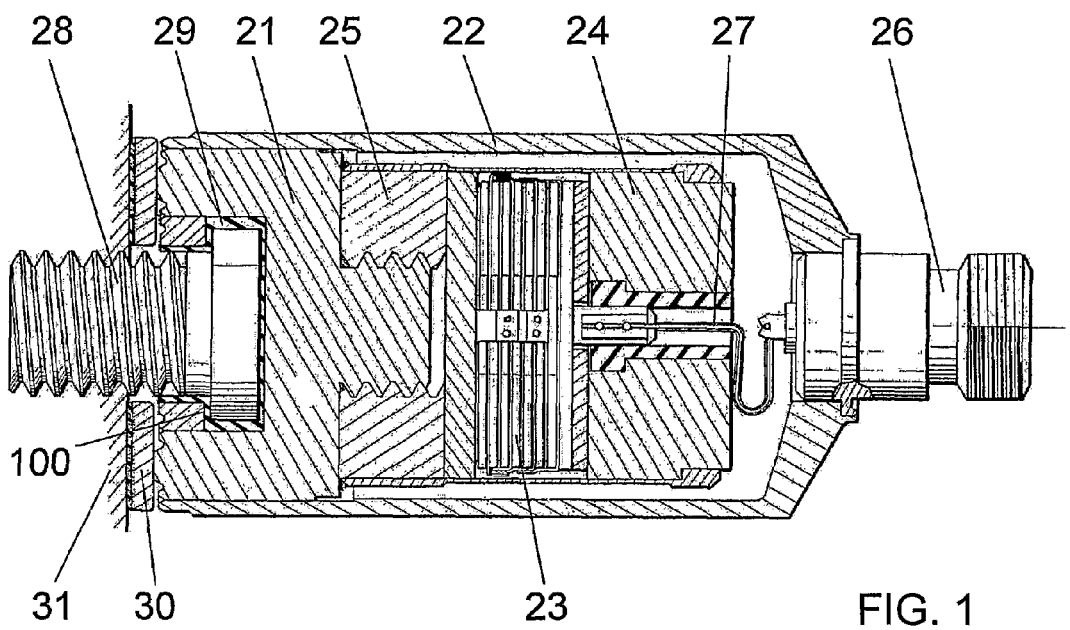
FIG. 1 is a cross section through a piezoelectric accelerometer known as state of the art.

Referring to the drawing of U.S. Pat. No. 3,746,869, the sensor according the state of the art takes the form in FIG. 1 of an accelerometer, including a base 21, an outer housing 22 and, spaced from its walls, a plurality of quartz wafers 23 sandwiched between a seismic mass 24 and a module base 25. One side of the quartz wafers 23 are connected through to the module base 25 and the outer housing 22 to an outer conductor of coaxial connector 26 forming one side of an electrical output. The other side of the quartz wafers 23 are connected by a lead 27 to an inner conductor of the coaxial connector 26 which forms the other side of the electrical output for the accelerometer.

Electrically insulating a mounting stud 28 from the base 21 are several layers of paper insulation soaked or impregnated with epoxy as indicated at 29. Finally, an insulating washer 30 having an electrically insulating coating over at least one surface insulates the base 21 from a mounting base 31.

A disadvantage is, that the insulator 29 has a small surface at a highly stressed area 100. Under full load, the insulator 29 might not resist the stress and be squeezed. Any direct contact from the housing 22 to the mounting base 31 results in an electrical ground loop.

Figure 2:
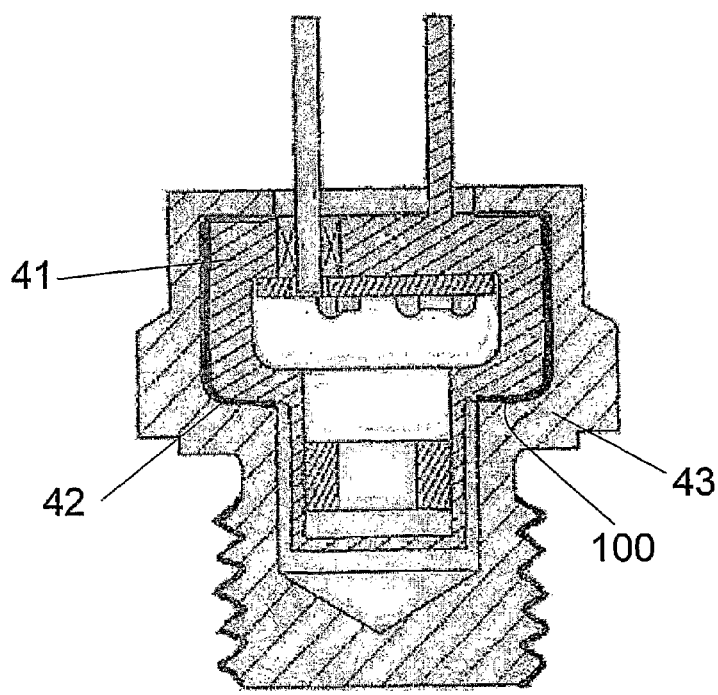
FIG. 2 a second cross section through a piezoelectric accelerometer known as state of the art.

A different configuration is given in FIG. 2. Here, the inner housing 41 is suspended between insulating rings 42 and sleeves to prevent it from making contact with the outer housing 43.

Both versions shown in FIG. 1 and FIG. 2 have a high stress area 100 when the load is very high such as in pyrotechnic shock events and in other high-g shock environments. In these cases, high level electrical parasitic charges are common. These electrical noises interfere with the signal to be measured. The maximum load or range a sensor can measure is limited by the surface area of the insulating material.

Figure 3:
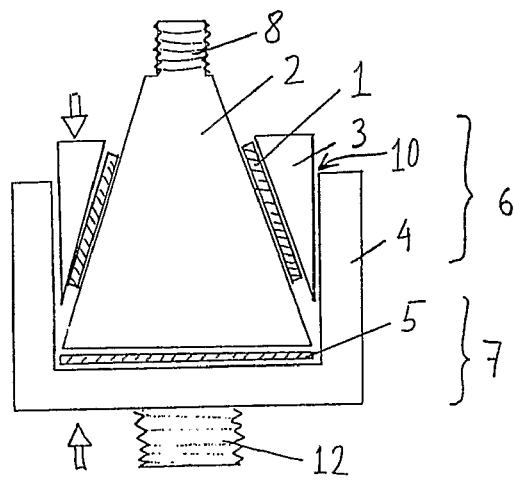
FIG. 3 a cross section through a piezoelectric sensor constructed in accordance with the present invention.
Figure 4:
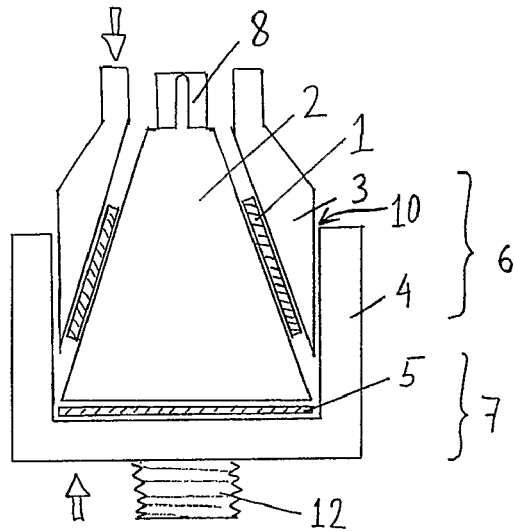
FIG. 4 a second cross section through a piezoelectric sensor constructed in accordance with the present invention.
Figure 5:
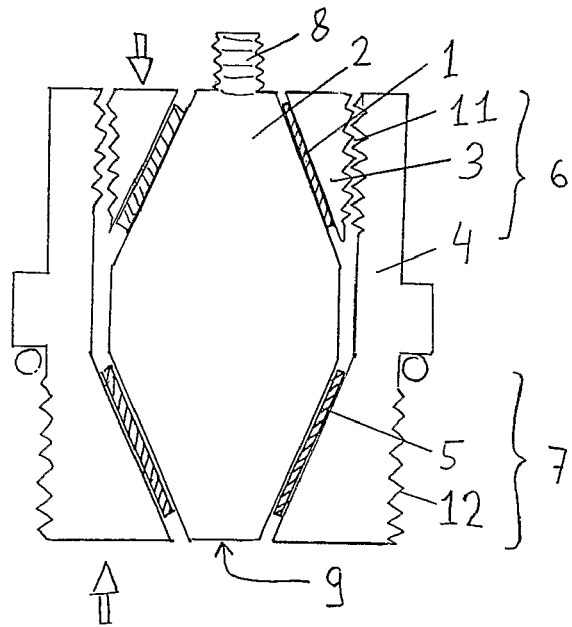
FIG. 5 a third cross section through a piezoelectric sensor constructed in accordance with the present invention.

FIGS. 3, 4 and 5 show cross sections through piezoelectric sensors constructed in accordance with the present invention. An element package 2 contains a piezoelectric sensor for the measurement of an acceleration or pressure input. The concept of the sensor can be similar to the configuration in FIG.

1 or it can be according any other design. G. Gautschi describes in his book "piezoelectric sensors" (Springer 2002) in chapter 9 varieties of acceleration sensor designs exploiting the longitudinal effect, the shear effect or responding to bending.

In measuring shock, the sensor should always be mounted in such a way, that the shock wave produces compression in the contact interface between sensor and object. Otherwise, the mounting stud or bolt would be loaded by tension, resulting in a softer coupling and a reduced rise time of the system.

For this reason, each element package 2 of FIGS. 3, 4 and 5 comprises an upper area 6 and a lower area 7. Each upper area 6 contains a contact interface to an insulation sleeve 1, and each lower area 7 contains a contact interface to an insulation part 5. These are the only contact areas of the element package 2 besides the cable adapter 8 for the signal.

The insulation sleeve 1 and the insulation part 5 may preferably be of Kapton® or Kapton® film, anodized aluminum, aluminum oxide, mica, a high performance polyamide material such as Vespel®, or paper.

A preload sleeve 3 surrounds the insulation sleeve 1 at the upper area 6. An outer housing 4 surrounds the insulation part 5 and the lower area 7 of the element package 2 as well as partially or fully the preload sleeve 3.

The upper area 6 of the element package 2, the insulation sleeve 1 and the inner surface of the preload sleeve 3 have conical shapes and are conforming in size. The insulation sleeve 1 can be slotted for better fit.

For assembling the sensor, the preload sleeve 3 is compressed axially against the outer housing 4, shown by the arrows in FIGS. 3, 4 and 5, with high load. The preload sleeve 3 is then connected to the outer housing 4 to retain the preload applied to the element package 2. This connection can be done for example by welding at the connecting point 10 between the preload sleeve 3 and the outer housing 4 as shown in FIGS. 3 and 4, or a screw thread 11 between the preload sleeve 3 and the outer housing 4 as shown in FIG. 5 can secure the applied preload. These methods create self-centering assemblies that keep the element package 2 concentric in respect to the preload sleeves 3 and the outer housings 4.

Due to the conical shape of the element package 2, the insulation sleeve 1 and the preload sleeve 3, the specific load on the insulation sleeve is reduced and thereby the maximum range of the sensor is increased. The outer housing 4 may comprise a mounting fixture 12 for mounting the sensor on a base. The mounting fixture 12 can for example be an outside thread attached to the outer housing 4 as shown in FIGS. 3 and 4 or an outside thread integrated into the outer surface of the outer housing 4 as shown in FIG. 5, comprising a gasket 13.

FIGS. 3 and 4 show two versions of an accelerometer. FIG. 3 shows a simple version of the invention. As shown in FIG. 4, the preload sleeve 3 can feature an extension in the direction of the cable adaptor 8 to fully surround the element package 2, without touching it, and thereby assuring the full case insulation. The cable adaptor 8 may vary in this application.

The advantage of a case insulation is, that only the outer housing 4 and the preload sleeve 3 are exposed to the surrounding, both having the electrical potential as the ground the sensor is mounted on. Any direct contact from the outer surface of the sensor to ground would not generate an electrical ground loop. This would be the case after a shortcut from the element package 2 to ground.

FIG. 5 shows an inventive version featuring an element package 2 with a double cone. In this version, both insulators, namely the insulation sleeve 1 and the insulation part 5, have conical shapes and conform in size and shape with the cones of the element package 2. The outer shape of the insulation part 5 conforms in size with the inner side of the lower area 7 of the outer housing 4, which is also conical. The upper area 6 of this sensor comprises of a preload sleeve 3 with the same functions and features as those in FIGS. 3 and 4. Alternatively, it can comprise a screw thread 11 as shown to fit an according screw thread of the outer housing 4 replacing a welding at point 10 shown in FIGS. 3 and 4.

The sensor shown in FIG. 5 may be a pressure sensor with a membrane 9. The insulation sleeve 1 can be slotted for better fit, but the insulation part 5 is also effective as a seal and can therefore not be slotted. Variations of the mounting fixture 12 for mounting the sensor to a rigid part and of the cable adaptor 8 for mounting a cable may be applied according to individual needs. The conical shaped configuration naturally centers the element package 2 assuring electrical insulation without the need of additional parts to center the sensor.

The advantage of this version is, that both insulators, namely the insulation sleeve 1 and the insulation part 5, comprise a large surface on which to distribute a high load. The surface area is therefore maximized.

The described features of the different embodiments shown in FIGS. 3, 4 and 5 can be combined for individual needs.

LIST OF REFERENCES

1 Insulation sleeve
2 Element package
3 Preload sleeve
4 Outer housing
5 Insulation part
6 Upper area
7 Lower area
8 Cable connector
9 Membrane or diaphragm
10 Welding point
11 Screw thread
12 Mounting fixture
13 Gasket
21 Base
22 Outer housing
23 Wafer
24 Seismic mass
25 Module base
26 Coaxial connector
27 Lead
28 Mounting stud
29 Insulator
30 Insulating washer
31 Mounting base
41 Inner housing
42 Insulating ring
43 Outer housing
100 High stress area

The invention claimed is:

1. Ground insulated piezoelectric sensor for the measurement of an acceleration or pressure input, comprising:
an element package (2) with piezoelectric elements, having an upper area (6) and a lower area (7);
a preload sleeve (3) surrounding said upper area (6) of said element package (2);
an insulation sleeve (1) between the upper area (6) of said element package (2) and said preload sleeve (3);
an outer housing (4) at least partially surrounding said preload sleeve (3) and the lower area (7) of said element package (2) and an insulation part (5) between said lower area (7) of the element package (2) and said outer housing (4);
wherein said upper area (6) of said element package (2), said insulation sleeve (1) and said preload sleeve (3) have conical shapes and have conforming surfaces.

2. Sensor according to claim 1, wherein said element package (2), said preload sleeve (3) and said insulation sleeve (1) being compressed axially into said outer housing (4).

3. Sensor according to claim 1, wherein said preload sleeve (3) is connected to said outer housing (4).

4. Sensor according to claim 3, wherein said connection is done by welding or threading.

5. Sensor according to claim 1, wherein said insulation sleeve (1) is slotted.

6. Sensor according to claim 1, wherein said insulation sleeve (1) is of Kapton® or Kapton® film, anodized aluminum, aluminum oxide, mica, a high performance polyamide material such as Vespel®, or paper.

7. Sensor according to claim 1, wherein said insulation part (5) is of Kapton® or Kapton® film, anodized aluminum, aluminum oxide, mica, a high performance polyamide material such as Vespel®, or paper.

8. Sensor according to claim 1, wherein the lower area (7) of said element package (2), said insulation part (5) and said outer housing (4) have conical shapes and have conforming surfaces.

9. Sensor according to claim 1, wherein said sensor is an accelerometer.

10. Sensor according to claim 1, wherein said sensor is a pressure sensor.

11. Sensor according to claim 1, wherein said outer housing (4) fully surrounds said preload sleeve (3) and said lower area (7) of said element package (2).

12. Sensor according to claim 2, wherein said outer housing (4) fully surrounds said preload sleeve (3) and said lower area (7) of said element package (2).

13. Sensor according to claim 2, wherein said preload sleeve (3) is connected to said outer housing (4).

14. Sensor according to claim 2, wherein the lower area (7) of said element package (2), said insulation part (5) and said outer housing (4) have conical shapes and have conforming surfaces.

15. Sensor according to claim 2, wherein said insulation sleeve (1) is slotted.

16. Sensor according to claim 2, wherein said sensor is an accelerometer.

17. Sensor according to claim 2, wherein said sensor is a pressure sensor.

18. Sensor according to claim 3, wherein said outer housing (4) fully surrounds said preload sleeve (3) and said lower area (7) of said element package (2).

19. Sensor according to claim 3, wherein the lower area (7) of said element package (2), said insulation part (5) and said outer housing (4) have conical shapes and have conforming surfaces.

20. Sensor according to claim 3, wherein said insulation sleeve (1) is slotted.

* * * * *